| (12) United States Patent<br>Eskridge, Jr. et al. | (10) Patent No.: US 9,692,468 B2<br>(45) Date of Patent: Jun. 27, 2017 |
|---|---|

(54) SPECTRUM SCRUBBER

(71) Applicant: SMARTSKY NETWORKS LLC, Charlotte, NC (US)

(72) Inventors: Elbert Stanford Eskridge, Jr., Chapel Hill, NC (US); Gerard James Hayes, Wake Forest, NC (US); Koichiro Takamizawa, Cary, NC (US); Joe Klein, Chatsworth, CA (US)

(73) Assignee: SMARTSKY NETWORKS, LLC, Charlotte, NC (US)

( * ) Notice: Subject to any disclaimer, the term of this patent is extended or adjusted under 35 U.S.C. 154(b) by 0 days.

(21) Appl. No.: 14/937,917

(22) Filed: Nov. 11, 2015

(65) Prior Publication Data

US 2017/0134059 A1 May 11, 2017

(51) Int. Cl.
*H04B 1/10* (2006.01)
*H04W 64/00* (2009.01)
*H04W 16/14* (2009.01)

(52) U.S. Cl.
CPC .......... *H04B 1/1036* (2013.01); *H04W 16/14* (2013.01); *H04W 64/006* (2013.01); *H04B 2001/1063* (2013.01)

(58) Field of Classification Search
CPC combination set(s) only.
See application file for complete search history.

(56) References Cited

U.S. PATENT DOCUMENTS

| 8,688,101 | B1* | 4/2014 | Hayes | H04W 4/02 370/230 |
|---|---|---|---|---|
| 2004/0157645 | A1* | 8/2004 | Smith | H01Q 1/246 455/562.1 |
| 2004/0203474 | A1* | 10/2004 | Miller | H04L 1/0001 455/69 |
| 2009/0264142 | A1* | 10/2009 | Sankar | H04L 5/0007 455/501 |
| 2010/0075689 | A1* | 3/2010 | Uemura | H04W 52/0206 455/452.1 |
| 2011/0009056 | A1* | 1/2011 | Hanson | H04B 7/15535 455/9 |
| 2012/0013398 | A1* | 1/2012 | Dabiri | H03H 21/0012 327/553 |
| 2015/0163817 | A1* | 6/2015 | Brunel | H04W 72/082 370/329 |

* cited by examiner

*Primary Examiner* — Yuwen Pan
*Assistant Examiner* — Zhitong Chen
(74) *Attorney, Agent, or Firm* — McNair Law Firm, P.A.

(57) ABSTRACT

A method of enhancing wireless communication performance includes receiving information indicative of a local interferer where the local interferer is identified based on dynamic position information indicative of a position of at least one mobile communication node, performing noise cancellation relative to a received signal by removing an interference signal associated with the local interferer to generate a scrubbed signal, and providing the scrubbed signal for additional signal processing.

19 Claims, 5 Drawing Sheets

SPECTRUM SCRUBBER

TECHNICAL FIELD

Example embodiments generally relate to wireless communications and, more particularly, relate to the use of noise cancellation techniques to enhance communication in potentially noisy environments.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

The ubiquity of these wireless communication devices, and the ability they provide to stay connected while mobile, has made the acquisition of sufficient radio frequency (RF) spectrum to support such communications of primary importance to those attempting to provide communication services to users. Network operators can pay billions of dollars for spectrum in an effort to enhance their ability to serve an ever expanding customer base. Whether or not spectrum is obtained through purchase, the clear incentive to network operators is to maximize their usage of the spectrum that is available to them. As the number of users employing a given segment of RF spectrum increases, the possibility of encountering complications from interference may also increase. Accordingly, it may be desirable to enhance the ability of RF spectrum, including particularly noisy spectrum, to be effectively utilized.

BRIEF SUMMARY OF SOME EXAMPLES

In one example embodiment, a method of enhancing wireless communication performance is provided. The method may include receiving information indicative of a local interferer where the local interferer is identified based on dynamic position information indicative of a position of at least one mobile communication node, performing noise cancellation relative to a received signal by removing an interference signal associated with the local interferer to generate a scrubbed signal, and providing the scrubbed signal for additional signal processing.

In another example embodiment, an apparatus for enhancing wireless communication performance is provided. The apparatus may include processing circuitry configured for receiving information indicative of a local interferer where the local interferer is identified based on dynamic position information indicative of a position of at least one mobile communication node, performing noise cancellation relative to a received signal by removing an interference signal associated with the local interferer to generate a scrubbed signal, and providing the scrubbed signal for additional signal processing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
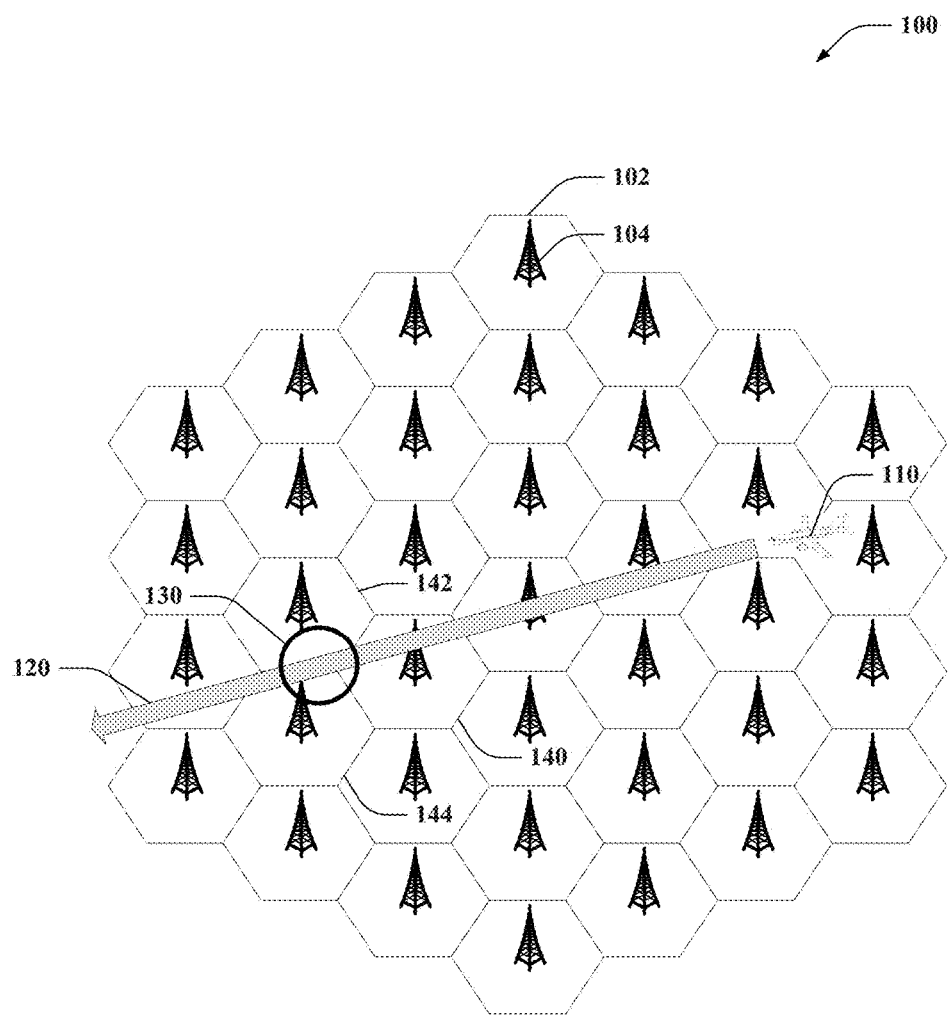
FIG. 1 illustrates an aircraft moving through the coverage areas of different access points over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used in herein, the terms "component," "module," and the like are intended to include a computer-related entity, such as but not limited to hardware, firmware, or a combination of hardware and software. For example, a component may be, but is not limited to being, a process running on a processor, a processor, an object, an executable, a thread of execution, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Artificial intelligence based systems (e.g., explicitly and/or implicitly trained classifiers) can be employed in connection with performing inference and/or probabilistic determinations and/or statistical-based determinations in accordance with one or more aspects of the subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for generating higher-level events from a set of events and/or data. Such inference results in the construction of new events or actions from a set of observed events or stored event data, regardless of whether the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.), for example, can be employed in connection with performing automatic and/or inferred actions in connection with the subject matter.

Thus, for example, some embodiments may provide a network device or system in which a component is provided to use local interference information to support noise cancellation. As such, in some cases, internally or externally derived position information associated with a mobile communication node within a network (i.e., a vehicle or aircraft or the communication devices thereon, or other mobile communication nodes (e.g., satellites)) may be used to consult a library of known interferers to obtain an interference profile for the position of the mobile communication node. The mobile communication node may then actively undertake to perform noise cancellation relative to the known interferers at or near the position.

Moreover, in some cases, the component may be configured to make inferences and/or probabilistic determinations about where and when such nodes will be disadvantageously impacted by various ones of the noise sources (i.e., known interferers), in order to selectively apply noise cancellation techniques when appropriate based on the interference profile for the position. Control signals and functionalities may therefore be generated for control of base stations and/or mobile communication nodes in light of efforts to minimize interference.

FIG. 1 illustrates an example layout of a wireless network 100 including multiple cells 102 for providing wireless communication services. The cells 102 can be implemented by one or more access points 104 to facilitate supporting wireless communications within a geographical coverage area of a given cell 102. In this regard, the one or more access points 104 can communicate with one or more wireless communication devices (not shown) present within a respective cell 102. The access points 104 can be assets of one or more existing wireless networks, and/or carriers supporting such networks. Each access point 104 has a wired (or wireless) backhaul connection to the one or more existing wireless networks to allow access thereto for the wireless communications devices connected with the access point 104. Moreover, the access points 104 can be provided via cellular towers or other tower structures (as in the depicted example), rooftops or other structures (e.g. building facades, church steeples, billboards, etc. . . . ) having wireless communication infrastructure, mobile vehicles and vessels, and/or the like. Moreover, in existing wireless networks, it is to be appreciated that some cells 102 may overlap or completely encompass one another, and/or coverage gaps may exist between some cells 102, etc., though FIG. 1 shows a deployment of substantially adjacent cells that are deployed to provide continuous coverage over a relatively large area.

It should be appreciated that although the cells 102 of FIG. 1 are shown having a particular shape (i.e., a hexagonal shape), cells of example networks could have any shape depending on terrain and/or building constraints. Moreover, it should also be appreciated that although the access points 104 of FIG. 1 are shown to be positioned substantially in the center of the cells 102 with coverage being provided substantially 360 degrees around each respective one of the access points 104, this structure is not required in all examples. To the contrary, access points 104 could be at cell edges or at any other position within the cells 102, and the cells 102 could take any suitable shape dictated by the radiation patterns and sector coverage deployments of the antennas and antenna arrays provided at each respective one of the access points 104. It should also be appreciated that although the cells 102 are generally depicted to end their respective coverage areas where the corresponding coverage area of an adjacent cell begins, there will typically be some amount of overlap in coverage areas of adjacent cells 102. Moreover, in one example embodiment, cells may have a half circle shape and may be comprised of wedge shaped coverage areas that overlap each other to provide a continuous coverage up to a predetermined altitude (e.g., about 40,000 feet). In such an example, the access points 104 may be positioned approximately at the center of the half circular shaped cells.

Example embodiments may be practiced with respect to communications between access points that are terrestrial or satellite based. Moreover, the mobile communication nodes supported could be on land, sea or in the air. In an example embodiment in which the wireless network 100 is an air-to-ground (ATG) network, the access points 104 may be enabled to establish wireless communication links to aircraft 110 or mobile communication nodes disposed thereon. The aircraft 110 can be expected to move through the network 100 in such a way as to require handover between various ones of the access points 104 in order to maintain continuous and uninterrupted communication between the mobile communication node(s) on the aircraft 110 and the network devices to which the backhaul connections couple the access points 104. Given that the cells 102 in an ATG network define three dimensional (3D) coverage areas that extend up to the predetermined altitude, it should therefore also be appreciated that the borders or edges between cells 102 may vary based on altitude. Thus, the borders between cells 102 in FIG. 1 may apply at a particular altitude. However, the borders may be different (or the same) at other altitudes. Thus, unlike a typical terrestrial network, where a change in latitude and longitude coordinates would typically be the driving determiner for which cell 102 the mobile communications nodes of the network select for communication purposes, within the network 100, a handover between cells could be necessitated or desirable merely on the basis of altitude change for a given location in terms of latitude and longitude coordinates.

As shown in FIG. 1, the aircraft 110 may follow a route 120 that causes the aircraft 110 to pass through certain ones of the cells 102. As the aircraft 110 passes through each respective one of the cells 102 along the route 120, the mobile communication node (or nodes) of the aircraft 110 may communicate with the respective 104 access points of the cells 102 along the route 120. However, the communication node (or nodes) of the aircraft 110 may not encounter or ever communicate with a number of the cells 102. In particular, the aircraft 110 may not communicate with cells 102 that are located remotely from the route 120.

Meanwhile, there may also be certain areas along the route 120 at which the aircraft 110 may be in or next two multiple cells 102 at a particular point in time. For example, in overlap region 130, the route 120 carries the aircraft 110 near the intersection of three different cells (e.g., a first cell 140, a second cell 142 and a third cell 144). The route 120 initially has the aircraft 110 completely within the first cell 140. However, the route 120 then carries the aircraft 110 proximate to the second cell 142. In this example, the aircraft 110 may actually spend a short time proximate to edges of the first cell 140, the second cell 142 and the third cell 144 at the same time. Then, the route 120 may provide that the aircraft 110 travels along the edge between the second cell 142 and the third cell 144 for a relatively long period of time.

In some networks, the mobile communication nodes on the aircraft 110 may be configured to request handover based on signal strength changes or the like in order to attempt to maintain continuous and uninterrupted coverage. Alternatively, the access points 104 may communicate with each other and the mobile communication nodes to handle handover decisions based on signal strength or other criteria. Meanwhile, according to some example embodiments, load balancing, antenna beamsteering, and/or interference mitigation (or prevention) may be accomplished by utilizing a network device that is configured to track and/or monitor position information regarding the aircraft 110 (and therefore also the position of the mobile communication nodes thereon) in order to make network control decisions.

In an ATG communications system, the end-user equipment (e.g., wired and wireless routers, mobile phones, laptop computers, on-board entertainment systems, and/or the like) may be installed or otherwise present on the aircraft 110. The user equipment (UE) and any receiving and/or routing device on the aircraft 110 itself may form mobile communication nodes of the wireless netowrk 100. However, as mentioned above, the utilization of position information associated with these mobile communication nodes may not simply involve knowledge of latitude and longitude, relative positioning, global positioning system (GPS) coordinates, and/or the like. Instead, knowledge of 3D position information including altitude and bearing may be required to give an accurate picture of mobile communication location for use in determining which access point 104 is best situated to provide optimum wireless connectivity for the mobile communication nodes. If the UE or the aircraft 110 is installed with a GPS device, Automatic Dependent Surivellance—Broadcast (ADS-B) or other internally or externally derived means of tracking location, speed, and altitude, then this location-specific information may be employed by the wireless system to enhance network control functions to provide load balancing, antenna beamsteering, interference mitigation, network security or recovery from denial of service. For example, the network may be aware of the location (which may be defined by GPS coordinates, range and bearing from a reference point, or the like) of each mobile communication node of the system in the three-dimensional airspace, and the network may therefore further be capable of controlling the frequencies, channels, transmission power, or other activity of the network assets (e.g., mobile communication nodes and/or access points 104) to improve network efficiency and/or performance. In some cases, the network may further determine or access information indicative of the bearing and airspeed of the aircraft 110 and/or the flight plan of the aircraft 110 in order to make predictive or anticipatory control decisions for operation of network assets. In particular, the control decisions may include the selective taking of active measures to perform noise cancellation to improve signal to noise ratios. For example, the interference profile for the position of the aircraft 110 (from the perspective of the aircraft 110 or the access point 104) may be used to identify specific noise signals to be canceled for the aircraft 110 and/or the access point 104.

In some example embodiments, information about the wireless network 100 configuration (e.g., the locations of the access points 104 and/or the locations or coverage areas of the cells 102 in terms of 3D space) may be stored in memory of a network entity. The network entity, with its knowledge of the configuration of the wireless network 100, and further with knowledge of the locations of the various mobile communication nodes, may be configured to assess the interference picture, currently and in the future, that the assets of the wireless network 100 are encountering or will encounter. An interference profile may then be used to tailor the performance of one or more of the antennas to be employed for communications between the access points 104 and the aircraft 110 to the interference picture by canceling signals of known interferers from the interference profile for the area.

In some cases, the network entity may be the same or a different network entity than that which is engaged to identify a best-serving access point for handover management or to further consider the load on each access point, the risk of interference, or other network performance parameters in making decisions on how to control network assets.

Accordingly, for example, the wireless network 100 of some embodiments may be configured to employ assets and/or equipment to actively or passively track mobile communication nodes (e.g., aircraft or UEs in the network) in the 3D airspace. As an example, the aircraft 110 (or devices thereon) taking off from an airport may access and synchronize with a base station near the airport. Once known to the wireless system, the aircraft 110 (or devices thereon) may periodically or continuously transmit position information (e.g., coordinates, altitude, direction and speed) to the serving base station. The base station may share the position information with a centralized server or other device in the core network. The centralized server (or other processing device) may then track, or predict the track for, the aircraft 110 (or devices thereon) and each other aircraft or device in the wireless network 100 in order to compare the network asset location (i.e., dynamic position information) against the database of access point locations of the wireless network 100. The centralized server may then be configured to determine when a particular aircraft (or device thereon) may be moving into or proximate to a different access point's coverage area. The centralized server may then provide instructions to various ones of the network assets (e.g., to the aircraft 110 (or a device thereon) or to the access point 104 (or a device thereat)) to provide interference mitigation functions on the basis of known interferers in the region based on the position information. In an example embodiment, the centralized server may be referred to as a network controller for the purposes of explanation of an example embodiment. In such an example, all or a majority of the processing needed to inform the network assets of at least an identity of the interfering signals (or the interference profile) may be provided by the network controller. Then noise cancellation can be accomplished for the antennas of the network assets by instances of a spectrum scrubber disposed at corresponding ones of such network assets.

Some example embodiments may therefore combine knowledge of network asset location (e.g., including fixed base station (or access point) positions (e.g., in 2D) and moving receiving station positions and/or predictions of future positions (e.g., in 3D)) and knowledge of known interferers in respective locations of the network to enable intelligent interference mitigation to scrub or remove noise from the spectrum being used for wireless communication for either or both of the airplane (or devices thereon) and the access points. Improved network efficiency and performance may therefore be maintained within an ATG system (or any other system involving mobile communication nodes), reducing the cost of network coverage and improving both handoff reliability and continuity of network connectivity for a given segment of RF spectrum. The improved efficiency and performance may potentially enable the wireless network 100 to be built with access points that are much farther apart than the typical distance between base stations in a terrestrial network and using crowded spectrum that may be filled with known interfering signals. In some cases, even unlicensed band communication may be conducted over long distances in a reliable manner by employing example embodiments since many of the potential WiFi interferers in a given region may be fairly constant and can thus be accounted for by spectrum scrubbing as described herein.

Figure 2:
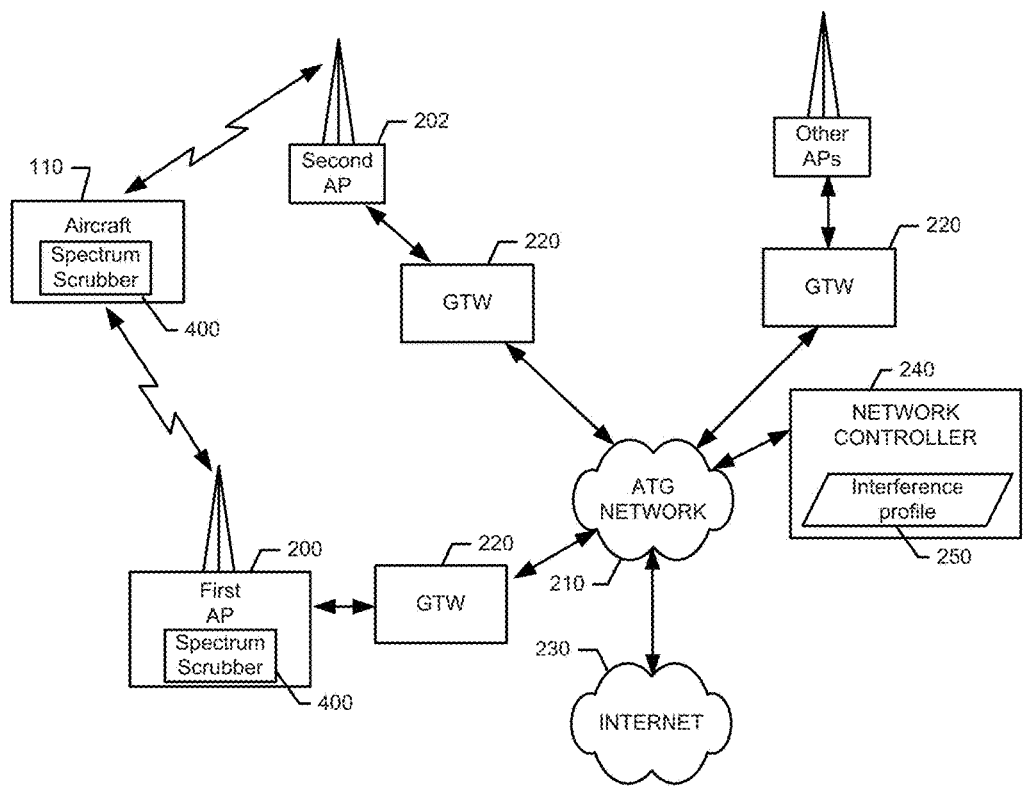
FIG. 2 illustrates a block diagram of a system for employing positional information for assisting with interference mitigation in accordance with an example embodiment.

FIG. 2 illustrates a functional block diagram of an ATG communication network that may employ an example embodiment. As shown in FIG. 2, a first access point 200 and a second access point 202 may each be base stations (e.g., examples of access points 104) of an example embodiment of the wireless network 100, which in this case may be an ATG network 210. The ATG network 210 may further include other access points (APs) as well, and each of the APs may be in communication with the ATG network 210 via a gateway (GTW) device 220. The ATG network 210 may further be in communication with a wide area network such as the Internet 230, Virtual Private Networks (VPNs) or other communication networks. In some embodiments, the ATG network 210 may include or otherwise be coupled to a packet-switched core or other telecommunications network.

In an example embodiment, the ATG network 210 may include a network controller 240 that may include, for example, switching functionality. Thus, for example, the network controller 240 may be configured to handle routing voice, video or data to and from the aircraft 110 (or to mobile communication nodes of or on the aircraft 110) and/or handle other data or communication transfers between the mobile communication nodes of or on the aircraft 110 and the ATG network 210. In some embodiments, the network controller 240 may function to provide a connection to landline trunks when the mobile communication nodes of or on the aircraft 110 is involved in a call. In addition, the network controller 240 may be configured for controlling the forwarding of messages and/or data to and from the mobile communication nodes of or on the aircraft 110, and may also control the forwarding of messages for the access points. It should be noted that although the network controller 240 is shown in the system of FIG. 2, the network controller 240 is merely an exemplary network device and example embodiments are not limited to use in a network employing the network controller 240. Moreover, although the network controller 240 is shown as a part of the ATG network 210 that is ground based, it should be appreciated that the network controller 240 could, in some embodiments, be provided on an aircraft to support aircraft to aircraft communications in a public or private mesh network environment. Furthermore, although the network controller 240 is shown as being communicatively coupled to the ATG network 210, it should be appreciated that the network controller 240 could be instantiated as part of the ATG network 210, at the aircraft 110, at any one or multiple ones of the APs, or in a separate network (e.g., accessible via the Internet 230).

The network controller 240 may be coupled to a data network, such as a local area network (LAN), a metropolitan area network (MAN), and/or a wide area network (WAN) (e.g., the Internet 230) and may be directly or indirectly coupled to the data network. In turn, devices such as processing elements (e.g., personal computers, laptop computers, smartphones, server computers or the like) can be coupled to the mobile communication nodes of or on the aircraft 110 via the Internet 230. The network controller 240 may include components and/or entities that are configured to obtain, learn, save, define or otherwise provide to other system components, one or more interference profiles 250 as described herein.

Although not every element of every possible embodiment of the ATG network 210 is shown and described herein, it should be appreciated that the mobile communication nodes of or on the aircraft 110 may be coupled to one or more of any of a number of different public or private networks through the ATG network 210. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz.

As shown in FIG. 2, in some cases, the aircraft 110 and/or the APs (e.g., the first AP 200 in this example) may include or host an instance of a spectrum scrubber 400 in accordance with an example embodiment. The spectrum scrubber 400 may be provided with or otherwise access the interference profile 250 for an area based on the dynamic position information associated with the aircraft 110. Thus, for the example of FIG. 2, the network controller 240 may determine for a given AP (e.g., the first AP 200) that the aircraft 110 is being served or will soon be served by the given AP. The network controller 240 may then provide the interference profile 250 that is generated or stored for the area of the first AP 200 to one or both of the spectrum scrubbers 400 of the aircraft 110 and the first AP 200. The spectrum scrubbers 400 may then interface with the antennas of the communication equipment of the aircraft 110 and/or the first AP 200 to perform noise cancellation for any noise sources identified in the interference profile 250.

Figure 3:
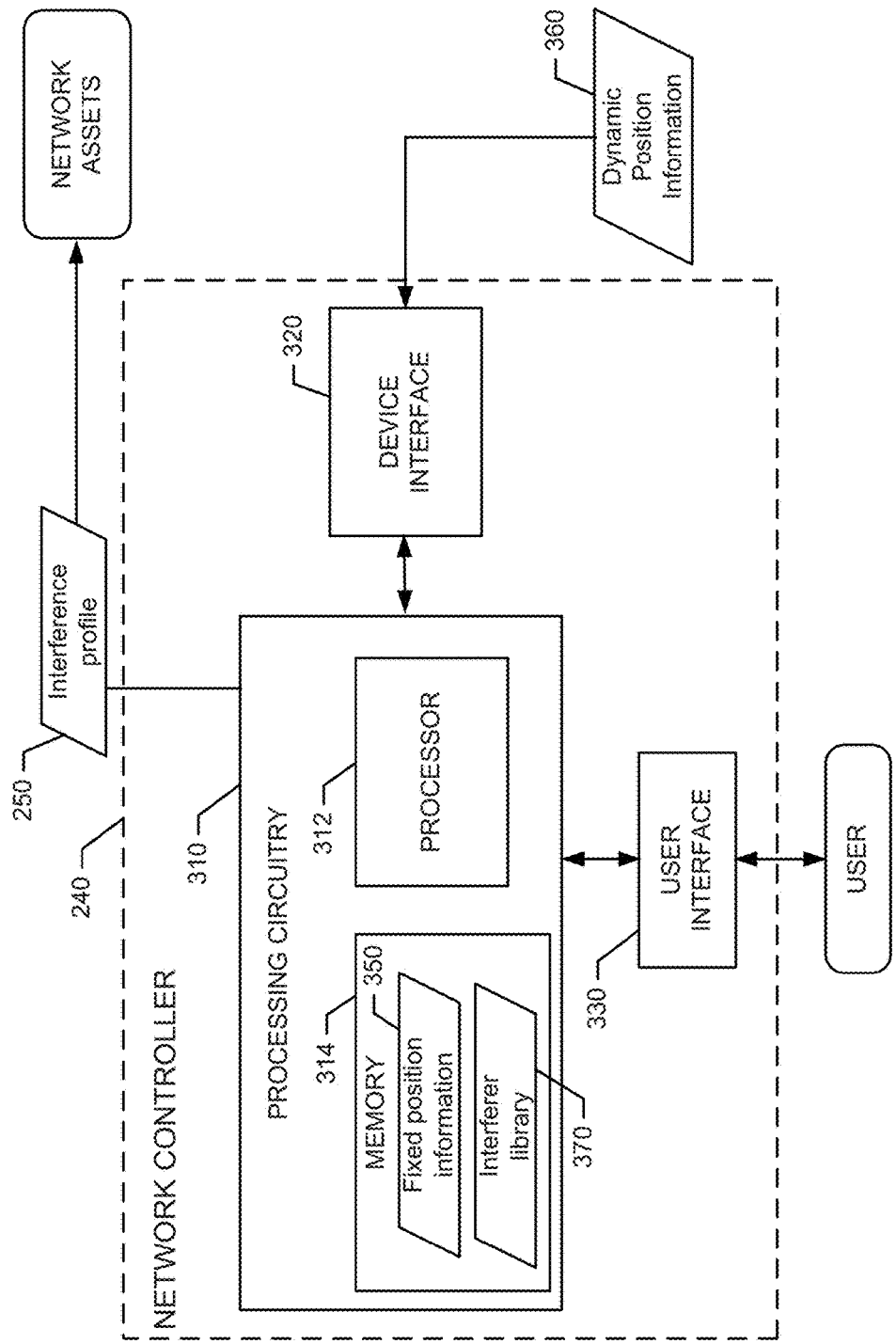
FIG. 3 illustrates a block diagram of a network controller that may be employed to assist performing operations according to an example embodiment.

FIG. 3 illustrates one possible architecture for implementation of the network controller 240 in accordance with an example embodiment. The network controller 240 may include processing circuitry 310 configured to provide control outputs and/or information for network assets based on processing of various input information including position information of mobile communication nodes of the network. The processing circuitry 310 may be configured to perform data processing, control function execution and/or other processing and management services according to an example embodiment. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. In some embodiments, the processing circuitry 310 may communicate with various components, entities and/or sensors of the ATG network 210.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a display, one or more levers, switches, indicator lights, touchscreens, proximity devices, buttons or keys (e.g., function buttons), and/or other input/output mechanisms.

The device interface 320 may include one or more interface mechanisms for enabling communication with other devices (e.g., modules, entities, sensors and/or other components/devices of the ATG network 210). In some cases, the device interface 320 may be any means such as a device or circuitry embodied in either hardware, or a combination of hardware and software that is configured to receive and/or transmit data from/to modules, entities, sensors and/or other components/devices of the ATG network 210 that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the network controller 240 based on inputs received by the processing circuitry 310 responsive to receipt of position information associated with various relative positions of the communicating elements of the network. As such, in some embodiments, the processor 312 (or the processing circuitry 310) may be said to cause each of the operations described in connection with the network controller 240 in relation to adjustments to be made to network configuration relative to providing service between access points and mobile communication nodes responsive to execution of instructions or algorithms configuring the processor 312 (or processing circuitry 310) accordingly. In particular, the instructions may include instructions for processing 3D position information of the mobile communication nodes (e.g., on an aircraft) along with 2D position information of fixed transmission sites in order to select a relevant interference profile for network assets (e.g., the aircraft or the fixed transmission site serving the aircraft). The relevant interference profile may then be used by the spectrum scrubber 400 of network assets to perform noise cancellation relative to known interferers to mitigate interference, increase efficiency or otherwise improve network performance associated with establishing a communication link between the mobile communication nodes and respective ones of the fixed transmission stations or access points as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with example embodiments. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the network controller 240 as described herein.

In an example embodiment, the memory 314 may store fixed position information 350 indicative of a fixed geographic location of access points of the ATG network 210. In some embodiments, fixed position information 350 may be indicative of the fixed geographic location of multiple ones (or even all) of the access points of the ATG network 210. The fixed position information 350 may be read out of memory and provided to (and therefore also received at) the processing circuitry 310 for processing in accordance with an example embodiment.

In an example embodiment, the processing circuitry 310 may be configured to receive dynamic position information 360 indicative of a three dimensional position and/or altitude and relative bearing and range of at least one mobile communication node (which should be appreciated to be capable of transmission and reception of signaling in connection with two way communication). In an example embodiment, the dynamic position information 360 may include latitude and longitude coordinates and altitude to provide a position in 3D space. In some cases, the dynamic position information 360 may further include heading and speed so that calculations can be made to determine, based on current location in 3D space, and the heading and speed (and perhaps also rate of change of altitude and heading), a future location of the aircraft 110 at some future time. In some cases, flight plan information may also be used for predictive purposes to either prepare assets for future network control actions that are likely to be needed, or to provide planning for network asset management purposes.

The dynamic position information 360 may be determined by any suitable method, or using any suitable devices. For example, the dynamic position information 360 may be determined using global positioning system (GPS) information onboard the aircraft 110, using data from Automatic Dependent Surveillance-Broadcast (ADS-B) or other such systems, based on triangulation of aircraft position based on a direction from which a plurality of signals arrive at the aircraft 110 from respective ones of the access points, using aircraft altimeter information, using radar information, and/or the like, either alone or in combination with each other. The mobile communication node may be a passenger device onboard the aircraft 110, or may be a wireless communication device of the aircraft 110 itself. The wireless communication device of the aircraft 110 may transfer information to and from passenger devices (with or without intermediate storage), or may transfer information to and from other aircraft communications equipment (with or without intermediate storage).

In an example embodiment, the processing circuitry 310 may be configured to determine a relative position of the aircraft 110 (or multiple aircraft) relative to one or more of the access points (e.g., the first access point 200, second access point 202 or other APs) based on the fixed position information 350 and the dynamic position information 360. In other words, the processing circuitry 310 may be configured to utilize information indicative of the locations of two devices or network assets and determine where the network assets are relative to one another from the perspective of either one of the network assets (or both). Of note, while the "relative position" could take the form of a range and bearing from a particular reference point (e.g., an access point), the relative position need not be that specific in all cases. Instead, the relative position could be a determination of the nearest access point to the aircraft 110 based on the fixed position information 350 and the dynamic position information 360. Additionally or alternatively, the relative position could be a determination of the access points that are within communication range (i.e., which access points are relatively close to the aircraft 110). In some embodiments, such determination may further include ranking the access points based on current distance (or signal strength) and/or based on estimates of future distance (or signal strength) based on a predicted future position of the aircraft 110 (and nodes thereon).

Accordingly, in some embodiments, tracking algorithms may be employed to track dynamic position changes and/or calculate future positions based on current location and rate and direction of movement. Thus, the relative position may, in some cases, be a predicted future position as mentioned above. The network controller 240 may therefore not only be able to determine the best one or more access points for the nodes of the aircraft 110 to connect to at any given point along the route 120, but the network controller 240 may also determine the access points that are likely to be the best access points for connection in the future for a predetermined period of time or even for the entire route. Thus, for example, the network controller 240 may be configured to determine a route communication plan that may define the access points to contact along the route 120 and corresponding times or locations for which the respective access points are the best access points. In some cases, an FAA flight plan may be used to determine the route communication plan.

Alternatively or additionally, the network controller 240 may estimate the route communication plan on the basis of information entered by the flight crew and/or historical information. Accordingly, for example, the route communication plan may provide a list of access point identifiers for which the nodes of the aircraft 110 should listen as each respective cell is approached so that handovers can be handled more easily and efficiently. Thus, the nodes can avoid or mitigate interference impacts by focusing in on a particular frequency or channel that is known in advance by looking for a particular access point identifier at a particular time when it is known that the access point identifier should be within or close to within range.

In an example embodiment, the memory 314 may additionally store an interferer library 370. The interferer library 370 may be a library or collection of noise sources. The library may be built based on the classification, identification or recording of noise sources that are experienced in a particular area with at least a threshold amount of regularity. As such, for example, if the first AP 200 is operating in the particular area using unlicensed band frequencies, the first AP 200 may be proximate to (or within communication range of) one or more unlicensed band transmitters (e.g., WiFi routers) that are frequently transmitting interfering (or potentially interfering) signals in the area. When the antenna of the first AP 200 receives potentially interfering signals, such signals may be analyzed by the processing circuitry 310 for classification or recognition as a local interferer. If a potentially interfering signal is noted or detected a threshold number of times (generally or within a given period), the potentially interfering signal may be recorded or otherwise classified in the interferer library 370. Thus, the interferer library 370 may be dynamically updateable based on sensing the current environment to add new potentially interfering signals to the interferer library 370. Similarly, if a previously known potentially interfering signal is not experienced or sensed in a given area for a predetermined period of time, the previously known potentially interfering signal may be deleted from the interferer library 370.

In some embodiments, the interferer library 370 may be descriptive of or otherwise record interference signals in association with their respective locations. In some cases, the respective locations may be a cell identifier, geographic coordinates (e.g., GPS coordinates, latitude/longitude, etc.), a relative position or direction from a fixed transmission site, and/or the like. As such, in some cases, the interferer library 370 may include information descriptive of interference signals for a given location that can be the same for both the aircraft 110 and the serving AP (e.g., the first AP 200) when the aircraft 110 is being served by a particular AP (e.g., the first AP 200). In such an example, the interference profile 250 provided to both the aircraft 110 and the first AP 200 may be the same when the aircraft 110 is served by the first AP 200. However, because finer position information, including a directional component, is also available, the interference profile 250 could be different for the aircraft 110 and the first AP 200 when the aircraft 110 is being served by the first AP 200. For example, if the aircraft 110 is transiting across a sector from North to West (relative to the first AP 200), the first AP 200 may not expect to receive any interference from a known interferer that is located to the Southeast of the first AP 200 when forming directional beams toward the aircraft 110 to communicate with the aircraft 110. However, it may be possible for the aircraft 110, when forming directional beams toward the first AP 200, to receive interference from the known interferer. Thus, for example, the interference profile 250 provided to the aircraft 110 may identify the known interferer, but the interference profile 250 provided to the first AP 200 may not include the known interferer.

In some embodiments, the network controller 240 may determine, in real-time or in advance, the cells through or proximate to which the aircraft 110 (or multiple aircraft) passes. Cells through or proximate to which each aircraft route passes may be selected cells. For each selected cell, the network controller 240 may reference the interferer library 370 to select applicable interferers that are likely (e.g., above a threshold amount of likelihood) to interfere with the aircraft 110 and/or fixed transmission sites in the selected cells. Likely interferers may then be selected for addition to the interference profile 250 to be provided to the aircraft 110 and/or its serving fixed transmission site.

In an example embodiment, the interference profile 250 may be transmitted to the network assets for use by the spectrum scrubber 400 at each respective network asset. However, it should be appreciated that the provision of the interference profile 250 need not be necessarily communicated remotely in all cases. In this regard, the network controller 240 may be a distributed asset, or may be embodied at the aircraft 110 or the fixed transmission sites themselves. Thus, in some examples, the interference profile 250 may actually be generated locally and the network controller 240 and spectrum scrubber 400 can be collocated or even the same device. However, in other examples, the network controller 240 may be a single device within the ATG network 210, or multiple regional network controllers may serve specific geographic regions and corresponding APs provided within the region.

Regardless of whether the provision of the interference profile 250 is conducted in real time, or includes future planning, the network controller 240 may be configured to provide the interference profile 250 to the spectrum scrubber 400 to enable the spectrum scrubber 400 to take active measures to mitigate interference by employing noise cancellation techniques.

Figure 4:
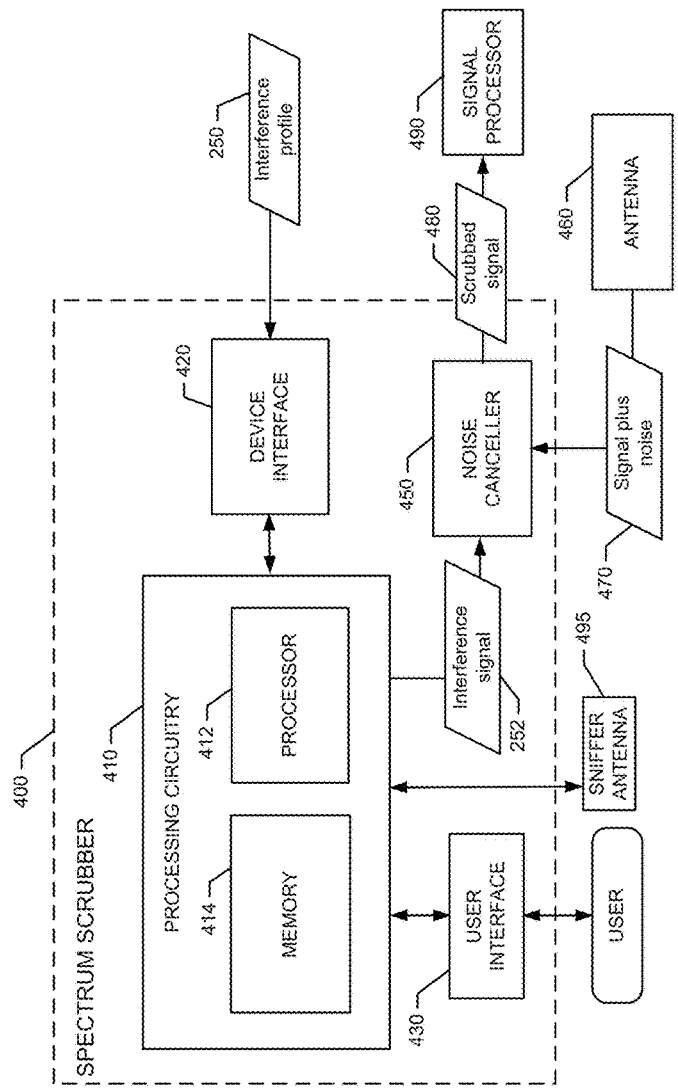
FIG. 4 illustrates a block diagram of a spectrum scrubber in accordance with an example embodiment.

FIG. 4 illustrates a block diagram of the structure of the spectrum scrubber 400 in accordance with an example embodiment. As shown in FIG. 4, the spectrum scrubber 400 may include processing circuitry 410 that includes a processor 412 and memory 414. The spectrum scrubber 400 may also include a device interface 420 (and in some cases also a user interface 430). The processing circuitry 410, processor 412, memory 414, device interface 420 and user interface 430 (if employed) may be similar in functional capability (and some cases also in form) to the corresponding processing circuitry 310, processor 312, memory 314, device interface 320 and user interface 330 except perhaps for differences in scale and configuration. Thus, details regarding the structure and capability of the processing circuitry 410, processor 412, memory 414, device interface 420 and user interface 430 will not be repeated.

In an example embodiment, the spectrum scrubber 400 may further include a noise canceller 450 that subtracts selected noise signals or interference signals out of a received signal received from an antenna 460 of the corresponding network asset (e.g., the aircraft 110, the first AP 200, the second AP 202, other APs, or individual UEs configured with an instance of the spectrum scrubber 400). Thus, for example, the interference profile 250 for the area in which the network asset is located may be provided to the spectrum scrubber 400. The interference profile 250 may identify one or more interference signals and one or more interference signals (e.g., interference signal 252) may be provided to the noise canceller 450 based on the interference profile 250. Signal plus noise 470 associated with a received signal from the antenna 460 may then be provided to the noise canceller 450, which may subtract the interference signal 252 from the signal plus noise 470 to generate a scrubbed signal 480 that can then be passed along to the signal processor 490 of the corresponding network asset. The signal processor 490 may then perform signal processing techniques to decode the received signal and extract the signal and any information therefrom.

The noise canceller 450 may be any means such as a device or circuitry embodied in either hardware, or a combination of hardware and software that is configured to subtract a known local interferer signal from a received signal to provide a cleaner signal (e.g., the scrubbed signal 480) that has at least some of the known noise for the current location of the network asset employing the noise canceller 450 removed. In some examples, the noise canceller 450 may be provided as hardware used for control of antenna components or signal processor or processing chain components. For example, in some cases, the noise canceller 450 may be provided via a tunable filter. Thus, for example, a tunable notch filter may be provided and the filter may be tuned to exclude the interference signal 252 (or signals). In an example embodiment, the tunable notch filter may define a frequency or range of frequencies at which interfering signals are removed. However, time domain notching may also be performed and, in some cases, time domain notching, frequency domain notching, or combinations of time and frequency domain notching may be performed for noise cancellation by the noise canceller 450. In some examples, the noise canceller 450 may be embodied via steering a null of the antenna 460 toward a known relative location of the noise signal (i.e., the interference signal 252). For example, null steering may be performed by steering a null toward the direction of arrival of the noise signal in connection with Multiple Signal Classification (i.e., the MUSIC algorithm), Estimation of Signal Parameters via Rotational Invariance Technique (ESPRIT) and/or the like. Spatial smoothing techniques may be employed to reduce the complexity of direction of arrival determinations in some cases.

In some alternatives, the noise canceller 450 may employ software or firmware to numerically remove the interference signal 252 (as shown in the example of FIG. 4). The numerical removal of the interference signal 252 can be performed as part of the signal processing chain (e.g., at the back end) or proximate to the antenna (e.g., a the front end). Monte Carlo sampling, Bayesian filtering, Newton's method or other numerical analysis techniques may be employed in relation to the numerical removal of the interference signal 252. Other techniques for noise cancellation are also possible. Moreover, in some cases, the noise canceller 450 may operate as part of an algorithm for removal of noise to find a best link budget in a particular scenario or situation.

By employing the noise canceller 450, the spectrum scrubber 400 may provide a dynamic capability for targeted "spectrum cleansing" to eliminate known interference signals so that signal processing may be more effective in a crowded segment of spectrum. However, regardless of whether crowded spectrum is employed, the elimination of known interferers, and the dynamic provision of the identities of such known interferers to assets moving between areas, can improve the efficiency and effectiveness of wireless communications. As such, the network assets become situationally aware assets that can take active steps to remove WiFi, Zigbee, or other potentially known interferer signals for mobile communication devices.

Similar to the example mentioned above, when the spectrum scrubber 400 receives a potentially interfering signal, such signal may be analyzed by the processing circuitry 410 for classification or recognition as a local interferer. Alternatively or additionally, information descriptive of the signal may be communicated to the network controller 240 for such analysis. If a potentially interfering signal is noted or detected a threshold number of times (generally or within a given period), the potentially interfering signal may be recorded or otherwise classified in the interferer library 370 at the network controller 240, or at a local instance of the interferer library, which could be maintained at the spectrum scrubber 400. In any case, as mentioned above, the interferer library may be dynamically updateable based on sensing the current environment to add new potentially interfering signals to the interferer library. When detected at the spectrum scrubber 400, detects the signal, such detection could be made via the antenna 460 in a mode that does not employ the noise canceller 450. However, in some embodiments, a separate antenna (e.g., sniffer antenna 495) may be provided to detect and/or facilitate classification of potentially interfering signals. The sniffer antenna 495 may also be configured to detect potential interferers on an aircraft, for example. Thus, the signals generated by devices of users on the aircraft, or other transmitters on the aircraft, may be detected and classified using the sniffer antenna 495. Thus, for example, internal access points, WiFi hotspots or other devices, Bluetooth devices, etc., may be detected and classified as interferers for cancellation. Thereafter, the identified/classified signals may be used to generate the interference signal 252 (in parallel with or independent of the interference profile 250) for cancellation by the noise canceller 450 as otherwise described herein.

Figure 5:
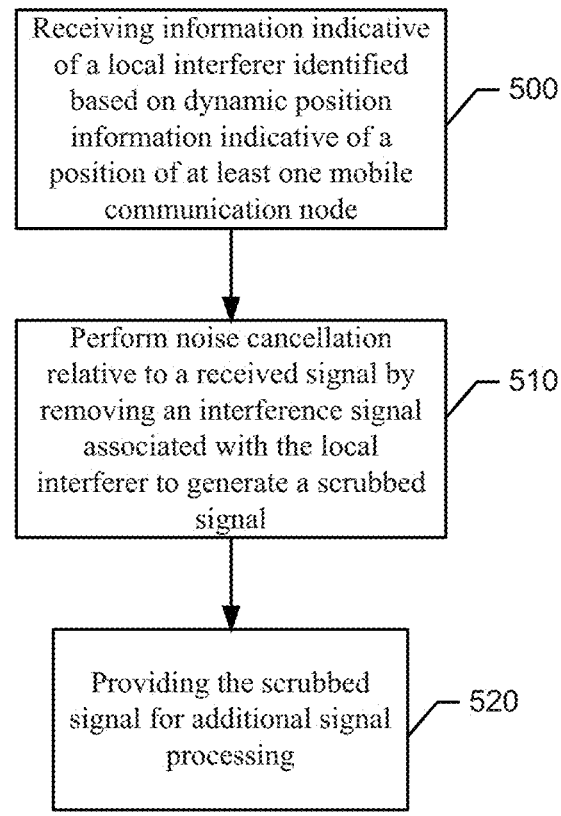
FIG. 5 illustrates a block diagram of a method for employing positional information for assisting with interference mitigation in accordance with an example embodiment.

As such, the system of FIG. 2 may provide an environment in which the network controller 240 of FIG. 3 and the spectrum scrubber 400 of FIG. 4 may provide a mechanism via which a number of useful methods may be practiced. FIG. 5 illustrates a block diagram of one method that may be associated with the system of FIG. 2 and the network controller 240 of FIG. 3 and the spectrum scrubber 400 of FIG. 4. From a technical perspective, the network controller 240 and/or the spectrum scrubber 400 described above may be used to support some or all of the operations described in FIG. 5. As such, the platform described in FIG. 2 may be used to facilitate the implementation of several computer program and/or network communication based interactions. As an example, FIG. 5 is a flowchart of a method and program product according to an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., of the network controller 240 or spectrum scrubber 400) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one example embodiment, as shown in FIG. 5, may include receiving information indicative of a local interferer at operation 500. The local interferer may be identified based on dynamic position information indicative of a position of at least one mobile communication node. Noise cancellation may then be performed relative to a received signal by removing an interference signal associated with the local interferer to generate a scrubbed signal at operation 510. Thereafter, at operation 520, the scrubbed signal may be provided for additional signal processing.

Defining the interference profile may be accomplished based on selecting local interferers from an interferer library based on the dynamic position information. As such, the relative position between the mobile communication node and the fixed or serving site may allow some interferers in the interferer library to be excluded from inclusion in the interference profile based on having a low likelihood of interfering given the relative position. Thereafter, performance of noise cancellation may be accomplished based on the interference profile at operation 520. The noise cancellation may include subtracting one or more interference signals from received signals to define a scrubbed signal. At operation 530, signal processing may be performed (e.g., on the scrubbed signal).

In some embodiments, the method may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, the dynamic position information may include a three dimensional position of an aircraft. In some cases, the local interferer may be identified in an interference profile indicative of one or more interference signals associated with the three dimensional position of the aircraft. In an example embodiment, the interference profile may be received at the aircraft from a network entity, and the interference profile may be received substantially in real time based on the three dimensional position of the aircraft, or for a projected future position of the aircraft. Alternatively or additionally, the interference profile may be received, from a network entity, at a fixed transmission site communicating with the aircraft, and the interference profile may be received substantially in real time based on the three dimensional position of the aircraft, or for a projected future position of the aircraft. In some cases, the interference profile may be provided to both the aircraft and a fixed transmission site communicating with the aircraft. However, in some cases, the interference profile may be provided to one of the aircraft or a fixed transmission site communicating with the aircraft, and a different interference profile may be provided to the other of the aircraft or a fixed transmission site communicating with the aircraft. In an example embodiment, the interference profile may include selected interferers from an interferer library including a plurality of known interferers associated with respective different locations. The selected interferers may be selected based on the dynamic position information. In such an example, the interferer library may be dynamically updateable to include additional interference signals detected a threshold number of times or detected the threshold number of times within a given period. Alternatively or additionally, the interferer library may be dynamically updateable to delete interference signals not detected for at least a given period. In some embodiments, performing the noise cancellation may include numerically removing the interference signal from the received signal, steering a null toward a location of the interference signal and/or tuning a notch filter to filter out the interference signal. In the context of some embodiments, the at least one mobile communication node may be provided at a vehicle, watercraft, aircraft or satellite.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An apparatus comprising processing circuitry configured to:
receive information indicative of a local interferer, the local interferer being identified based on dynamic position information indicative of a position of an aircraft;
perform noise cancellation relative to a received signal by removing an interference signal associated with the local interferer to generate a scrubbed signal; and
provide the scrubbed signal for additional signal processing,
wherein the local interferer is identified in an interference profile indicative of one or more interference signals associated with the position of the aircraft,
wherein the interference profile includes selected interferers from an interferer library including a plurality of known interferers associated with respective different locations, and
wherein the interferer library is dynamically updateable to include additional interference signals detected a threshold number of times or detected the threshold number of times within a given period, wherein the threshold number of times is an integer value greater than one.

2. The apparatus of claim 1, wherein the dynamic position information comprises a three dimensional position of the aircraft.

3. The apparatus of claim 2, wherein the interference profile is received at the aircraft from a network entity, and wherein the interference profile is received substantially in real time based on the three dimensional position of the aircraft.

4. The apparatus of claim 2, wherein the interference profile is received, from a network entity, at a fixed transmission site communicating with the aircraft, and wherein the interference profile is received substantially in real time based on the three dimensional position of the aircraft.

5. The apparatus of claim 1, wherein the interference profile is received at the aircraft from a network entity, and wherein the interference profile is provided for a projected future position of the aircraft.

6. The apparatus of claim 1, wherein the interference profile is received, from a network entity, at a fixed transmission site communicating with the aircraft, and wherein the interference profile is provided for a projected future position of the aircraft.

7. The apparatus of claim 1, wherein the interference profile is provided to both the aircraft and a fixed transmission site communicating with the aircraft.

8. The apparatus of claim 1, wherein the interference profile is provided to one of the aircraft or a fixed transmission site communicating with the aircraft, and a different interference profile is provided to the other of the aircraft or a fixed transmission site communicating with the aircraft.

9. The apparatus of claim 2, wherein the selected interferers are selected based on the dynamic position information.

10. The apparatus of claim 9, wherein the interferer library is dynamically updateable to delete interference signals not detected for at least a given period.

11. The apparatus of claim 1, wherein performing the noise cancellation comprises numerically removing the interference signal from the received signal.

12. The apparatus of claim 1, wherein performing the noise cancellation comprises steering a null toward a location of the interference signal.

13. The apparatus of claim 1, wherein performing the noise cancellation comprises tuning a notch filter to filter out the interference signal.

14. A method of enhancing wireless communication performance, the method comprising:
receiving information indicative of a local interferer, the local interferer being identified based on dynamic position information indicative of a position of an aircraft;

performing noise cancellation relative to a received signal by removing an interference signal associated with the local interferer to generate a scrubbed signal; and providing the scrubbed signal for additional signal processing, wherein the local interferer is identified in an interference profile indicative of one or more interference signals associated with the position of the aircraft, wherein the interference profile includes selected interferers from an interferer library including a plurality of known interferers associated with respective different locations, and wherein the interferer library is dynamically updateable to include additional interference signals detected a threshold number of times or detected the threshold number of times within a given period, wherein the threshold number of times is an integer value greater than one.

15. The method of claim 14, wherein performing the noise cancellation comprises numerically removing the interference signal from the received signal.

16. The method of claim 14, wherein performing the noise cancellation comprises steering a null toward a location of the interference signal.

17. The method of claim 14, wherein performing the noise cancellation comprises tuning a notch filter to filter out the interference signal.

18. The apparatus of claim 1, wherein receiving information indicative of the local interferer comprises receiving the information in advance of the aircraft being in a cell in which the local interferer is located, and wherein performing noise cancellation relative to the received signal comprises employing a noise cancellation technique selected in advance of the aircraft being in the cell in which the local interference is located.

19. The method of claim 14, wherein receiving information indicative of the local interferer comprises receiving the information in advance of the aircraft being in a cell in which the local interferer is located, and wherein performing noise cancellation relative to the received signal comprises employing a noise cancellation technique selected in advance of the aircraft being in the cell in which the local interference is located.

* * * * *